(12) United States Patent
Ke et al.

(10) Patent No.: US 12,191,461 B2
(45) Date of Patent: Jan. 7, 2025

(54) BATTERY CELL HOLDER, BATTERY MODULE, BATTERY AND ELECTRICAL APPARATUS

(71) Applicant: CONTEMPORARY AMPEREX TECHNOLOGY (HONG KONG) LIMITED, Hong Kong (CN)

(72) Inventors: Qingpeng Ke, Ningde (CN); Xin Pan, Ningde (CN); Zhijie Huang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 235 days.

(21) Appl. No.: 17/975,514

(22) Filed: Oct. 27, 2022

(65) Prior Publication Data

US 2023/0131069 A1 Apr. 27, 2023

Related U.S. Application Data

(63) Continuation of application No. PCT/CN2022/097943, filed on Jun. 9, 2022.

(30) Foreign Application Priority Data

Oct. 22, 2021 (CN) .......................... 202111235968.9

(51) Int. Cl.
*H01M 10/48* (2006.01)
*H01M 10/6556* (2014.01)
*H01M 10/658* (2014.01)
*H01M 50/204* (2021.01)

(52) U.S. Cl.
CPC ..... *H01M 10/482* (2013.01); *H01M 10/6556* (2015.04); *H01M 10/658* (2015.04); *H01M 50/204* (2021.01)

(58) Field of Classification Search
CPC ........... H01M 10/482; H01M 10/6556; H01M 10/658; H01M 50/204; H01M 10/6557;
(Continued)

(56) References Cited

U.S. PATENT DOCUMENTS 6,428,925 B1* 8/2002 Takeno ............... H01M 50/213
429/163
2009/0263708 A1* 10/2009 Bender ............... H01M 10/643
429/120

(Continued)

FOREIGN PATENT DOCUMENTS

CN 207368163 U 5/2018
CN 210379236 U 4/2020
(Continued)

OTHER PUBLICATIONS

International Search Report and Written Opinion, PCT/CN2022/097943, Sep. 14, 2022, 9 pgs.
(Continued)

*Primary Examiner* — Muhammad S Siddiquee
(74) *Attorney, Agent, or Firm* — Anova Law Group, PLLC

(57) ABSTRACT

The present application discloses a battery cell holder, a battery module, a battery, and an electrical apparatus. The battery cell holder includes: a holder body and an insulating member. The holder body is provided with at least one first channel in a first direction, and the insulating member is arranged on an outer surface of the holder body. The insulating member covers part or all of the outer surface, and the surface of the insulating member facing away from the holder body is capable of fixing a battery cell. By providing the holder body with the first channel, and fixing the battery cell to the holder body on the peripheral side of the first channel, after the battery cell radiates heat, the heat flows out through the first channel, so that the temperatures of the (Continued)

battery cell itself and the environment surrounding the battery cell can be reduced, thereby alleviating the battery safety problem caused by the accumulation of heat during the use of the battery.

20 Claims, 7 Drawing Sheets

(58) Field of Classification Search
CPC ............ H01M 50/262; H01M 50/213; H01M 10/613; H01M 10/643; H01M 50/588; H01M 50/593; H01M 50/291; H01M 10/6551; H01M 50/24; H01M 50/293; H01M 50/572; H01M 2220/20; Y02E 60/10
See application file for complete search history.

(56) References Cited

U.S. PATENT DOCUMENTS

| | | | | |
|---|---|---|---|---|
| 2011/0135993 | A1* | 6/2011 | An | H01M 10/6557 429/156 |
| 2022/0278406 | A1* | 9/2022 | Fragniere | H01M 50/502 |

FOREIGN PATENT DOCUMENTS

| | | |
|---|---|---|
| CN | 210576332 U | 5/2020 |
| DE | 10352046 A1 | 6/2005 |
| EP | 3319148 A1 | 5/2018 |
| JP | 2008130330 A | 6/2008 |
| JP | 2008311130 A | 12/2008 |
| JP | 2013030430 A | 2/2013 |
| WO | WO2009141348 A1 | 11/2009 |

OTHER PUBLICATIONS

Japan Patent Office (JPO) Decision to Grant a Patent For JP Application No. 2022-562497 Apr. 23, 2024 6 Pages (including translation).

The European Patent Office (EPO) Extended Search Report for EP Application No. 22783413.2 Mar. 12, 2024 5 Pages.

The Japan Patent Office (JPO) Notification of Reasons for Refusal for Application No. 2022-562497 Dec. 19, 2023 6 Pages(including translation).

* cited by examiner

BATTERY CELL HOLDER, BATTERY MODULE, BATTERY AND ELECTRICAL APPARATUS

CROSS-REFERENCE TO RELATED APPLICATIONS

This application is a continuation application of PCT Patent Application No. PCT/CN2022/097943, entitled "BATTERY CELL HOLDER, BATTERY MODULE, BATTERY AND ELECTRICAL APPARATUS" filed on Jun. 9, 2022, which claims priority to Chinese Patent Application No. 202111235968.9, filed with the State Intellectual Property Office of the People's Republic of China on Oct. 22, 2021, and entitled "BATTERY CELL HOLDER, BATTERY MODULE, BATTERY AND ELECTRICAL APPARATUS", all of which are incorporated herein by reference in their entirety.

TECHNICAL FIELD

The present application relates to the technical field of batteries, and in particular to a battery cell holder, a battery module, a battery, and an electrical apparatus.

BACKGROUND ART

Energy saving and emission reduction is the key to the sustainable development of automotive industry, electric vehicles have become an important part of the sustainable development of automotive industry due to their advantages of energy saving and environmental protection. For electric vehicles, battery technology is an important factor related to their development.

In the process of charging and discharging the existing battery, heat is radiated from battery cells in the battery and is accumulated over time, thereby affecting the safety performance of the battery.

SUMMARY OF THE INVENTION

In view of the above problem, the present application provides a battery cell holder, a battery module, a battery and an electrical apparatus, which can alleviate the battery safety problem caused by the accumulation of heat during the use of the battery.

In a first aspect, the present application provides a battery cell holder, including: a holder body and an insulating member. The holder body is provided with at least one first channel in a first direction, and the insulating member is arranged on an outer surface of the holder body. The insulating member covers part or all of the outer surface, and the surface of the insulating member facing away from the holder body is capable of fixing a battery cell.

In the technical solution of the embodiment of the present application, by providing the holder body with the first channel, and fixing the battery cell to the holder body on the peripheral side of the first channel, after the battery cell radiates heat, the heat flows out through the first channel, so that the temperatures of the battery cell itself and the environment surrounding the battery cell can be reduced, thereby alleviating the battery safety problem caused by the accumulation of heat during the use of the battery.

In some embodiments, the outer surface of the holder body is provided with a connecting portion around the first direction, the surface of the connecting portion facing away from the holder body is a connecting surface recessed to form at least one accommodating recess, and an inner wall of the accommodating recess has a shape adapted to that of a partial surface of the battery cell; and the insulating member is arranged on the surface of the connecting portion facing away from the holder body. By configuring the shape of the accommodating recess to be adapted to the shape of the partial surface of the battery cell, when the battery cell is fixed in the accommodating recess, there is no gap between the battery cell and the holder body, so that the connection between the battery cell and the battery cell holder is stronger.

In some embodiments, the accommodating recess is in the shape of an elongated strip in the first direction, and the accommodating recess is in the shape of a recessed arc surface around the first direction; and/or the connecting portion is provided with a plurality of accommodating recesses evenly distributed on the connecting surface of the connecting portion. By configuring the accommodating recess in the shape of an elongated strip in the first direction, and the accommodating recess is in the shape of a recessed arc surface around the first direction, the battery cell holder can be adapted to connect a cylindrical battery cell, and can fix the cylindrical battery cell more firmly. By providing the connecting portion with a plurality of accommodating recesses evenly distributed on the outer surface of the connecting portion, the battery cell holder can fix a plurality of battery cells, and after the plurality of battery cells are fixed, the heat dissipation effect is more uniform and the visual effect is good.

In some embodiments, the connecting portion is a heat conducting member; and/or the connecting portion is integrally formed with the holder body; and/or a second channel extending in the first direction is provided between the connecting portion and the holder body. By configuring the connecting portion as a heat conducting member, the heat radiated from the battery cell fixed to the battery cell holder can be conducted more and faster to the connecting portion close to the first channel, and then dissipated through the first channel, so that the temperatures of the battery cell itself that is fixed to the battery cell holder and the environment surrounding the battery cell can be further reduced. By integrally forming the connecting portion with the holder body, the structural strength of the battery cell holder can be increased. By providing a second channel, which extends in the first direction, between the connecting portion and the holder body, the heat radiated from the battery cell fixed to the battery cell holder can be simultaneously dissipated through the first channel and the second channel, so that the temperatures of the battery cell itself that is fixed to the battery cell holder and the environment surrounding the battery cell can be further reduced.

In some embodiments, the insulating member includes a first insulating strip and a second insulating strip, wherein the first insulating strip is arranged in a circle around the connecting surface on the peripheral side of the connecting portion, the second insulating strip is arranged in a circle around the connecting surface on the peripheral side of the connecting portion, and the second insulating strip and the first insulating strip are spaced apart from each other. The battery cell can be separated from the holder body by means of the first insulating strip and the second insulating strip, so that the holder body can be prevented from being electrified.

In some embodiments, the surface of the first insulating strip facing away from the connecting portion is recessed to form a first fixing recess adapted in shape to a partial surface of the battery cell, and the surface of the second insulating strip facing away from the connecting portion is recessed to form a second fixing recess adapted in shape to a partial surface of the battery cell. By adapting the first fixing recess on the first insulating strip and the second fixing recess on the second insulating strip in shape to a partial surface of the battery cell, after the battery cell is fixed to the battery cell holder, there is no gap between the battery cell and the first insulating strip and the second insulating strip, so that the structural stability of the battery cell and the battery cell holder can be improved.

In some embodiments, the two ends of the connecting portion in the first direction are respectively provided with a first snap-fit portion, the first insulating strip is provided with a second snap-fit portion, the second insulating strip is provided with a third snap-fit portion, and the second snap-fit portion and the third snap-fit portion are respectively snap-fitted with the first snap-fit portions at the two ends of the connecting portion. The first insulating strip can be fixed to one end of the connecting portion by snap-fitting the second snap-fit portion with the first snap-fit portion at one end of the connecting portion, and the second insulating strip can be fixed to the other end of the connecting portion by snap-fitting the third snap-fit portion with the first snap-fit portion at the other end of the connecting portion. Moreover, a high connection efficiency between the insulating member and the connecting portion is achieved by means of snap-fit.

In some embodiments, the first snap-fit portions are snap-fit through holes; and the second snap-fit portion and the third snap-fit portion are both snap-fit posts, and a free end of each snap-fit post is provided with a hooking portion. The fast connection between the first insulating strip, the second insulating strip and the connecting portion can be realized through the cooperation of the snap-fit through holes, the snap-fit posts and the hooking portions on the snap-fit posts, so that the assembly efficiency of the battery cell holder can be improved.

In some embodiments, the holder body is a heat conducting member; and/or two ends of the holder body in the first direction are respectively provided with a first flange and a second flange, wherein the first flange is provided with a first connecting structure, and the second flange is provided with a second connecting structure. By configuring the holder body as a heat conducting member, the heat of the battery cell itself that is fixed to the battery cell holder and the surrounding environment can be conducted to the holder body more and faster and then dissipated through the first channel in the holder body. The battery cell holder can be fixed in the box body of the battery module more conveniently by means of the first connecting structure of the first flange and the second connecting structure of the second flange.

In a second aspect, the present application provides a battery module, including: a battery cell and the battery cell holder described in any one of the above solutions, wherein the battery cell is connected to the surface of the insulating member of the battery cell holder facing away from the holder body.

In a third aspect, the present application further provides a battery, including the battery module of any one of the above solutions.

In a fourth aspect, the present application further provides an electrical apparatus, including the battery of any one of the above solutions.

The above description is only a summary of the technical solutions of the present application. In order to be able to understand the technical means of the present application more clearly, the technical means can be implemented according to the content of the specification. Furthermore, to make the above and other objectives, features and advantages of the present application more comprehensible, specific implementations of the present application are exemplified below.

DESCRIPTION OF DRAWINGS

By reading the detailed description of the preferred implementations below, various other advantages and benefits will become apparent to those of ordinary skill in the art. The drawings are for the purpose of illustrating the preferred implementations only and are not to be considered a limitation to the present application. Moreover, in all of the drawings, the same parts are indicated by the same reference numerals. In the drawings.

Figure 1:
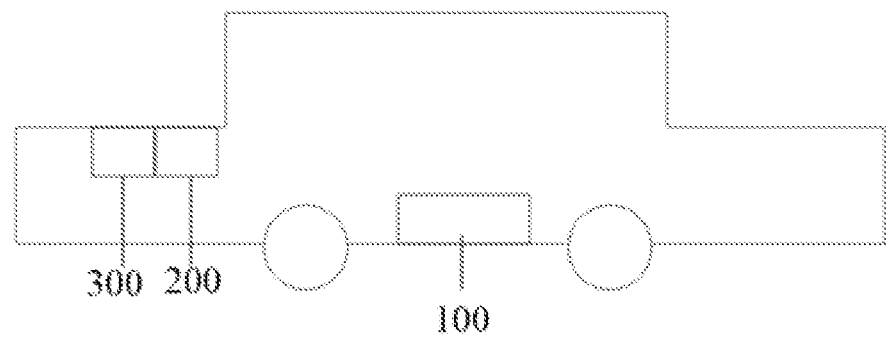
FIG. 1 is a schematic structural view of a vehicle according to some embodiments of the present application.

Reference numerals in Detailed Description are as follows:

1000—vehicle; 100—battery, 200—controller, 300—motor; 10—box body, 11—first part, 12—second part; 20—battery module, 21—battery cell; 22—battery cell holder, 221—holder body, 2211—first channel, 2212—connecting portion, 2213—accommodating recess, 2214—first snap-fit portion; 222—insulating member, 222a—first insulating strip, 222b—second insulating strip, 2221—second snap-fit portion, 2222—third snap-fit portion, 2223—second snap-fit through hole, 2224—second snap-fit post, 2225—second hooking portion, 2226—first sub-end, 2227—second sub-end, 2228—first sub-hooking portion, and 2229—second sub-hooking portion.

DETAILED DESCRIPTION

Embodiments of the technical solutions of the present application will be described in detail below with reference to the accompanying drawings. The following embodiments are only used to more clearly illustrate the technical solution of the present application, and therefore are only used as examples and cannot be used to limit the scope of protection of the present application.

Unless otherwise defined, all technical and scientific terms used herein have the same meaning as commonly understood by those skilled in the art belonging to the technical field of the present application; the terms used herein are intended only for the purpose of describing specific embodiments and are not intended to limit the present application; the terms "including" and "having" and any variations thereof in the specification and the claims of the present application and in the description of drawings above are intended to cover non-exclusive inclusion.

In the description of the embodiments of the present application, the technical terms "first", "second", and the like are used only to distinguish between different objects, and are not to be understood as indicating or implying a relative importance or implicitly specifying the number, particular order, or primary and secondary relation of the technical features indicated. In the description of the embodiments of the present application, the meaning of "a plurality of" is two or more, unless otherwise explicitly and specifically defined.

Reference herein to "an embodiment" means that a particular feature, structure, or characteristic described in connection with the embodiment can be included in at least one embodiment of the present application. The appearance of this phrase in various places in the specification does not necessarily refer to the same embodiment, nor is it a separate or alternative embodiment that is mutually exclusive with other embodiments. It is explicitly and implicitly understood by those skilled in the art that the embodiments described herein may be combined with other embodiments.

In the description of the embodiments of the present application, the term "and/or" is simply a description of an association of associated objects, which indicates that there may exist three relationships, for example, A and/or B may mean: the presence of A, the presence of both A and B, and the presence of B. In addition, the character "/" herein generally means that the associated objects before and after it are in an "or" relationship.

In the description of the embodiments of the present application, the term "plurality of" refers to at least two (including two); similarly, "plurality of groups" refers to at least two (including two) groups, and "plurality of pieces" refers to at least two (including two) pieces.

In the description of the embodiments of the present application, the orientation or location relationships indicated by the technical terms "center", "longitudinal", "transverse", "length", "width", "thickness", "up", "down", "front", "back", "left", "right", "vertical", "horizontal", "top", "bottom", "inside", "outside", "clockwise", "counterclockwise", "axial", "radial", "circumferential" and the like are based on the orientation or location relationships shown in the drawings, and are only for convenience and simplification of the description of the embodiments of the present application, but do not indicate or imply that the apparatuses or elements referred to must have particular orientations, be constructed and operated in particular orientations, and therefore cannot be construed as a limitation of the embodiments of the present application.

In the description of the embodiments of the present application, unless otherwise expressly specified and limited, the technical terms "mounting," "connected," "connecting", "fixing", and the like shall be understood in a broad sense, which, for example, may be a fixed connection, or a detachable connection or an integral connection; may also be a mechanical connection, or an electrical connection; may be a direct connection, or an indirect connection through an intermediate medium, and may be a communication within two elements or an interactive relationship between two elements. For those of ordinary skill in the art, the specific meanings of the above terms in the embodiments of the present application can be understood according to specific situations.

At present, from the perspective of the development of the market situation, power batteries are more and more widely used. Power batteries are used in energy storage power source systems such as hydraulic, thermal, wind and solar power stations as well as in electric vehicles such as electric bicycles, electric motorcycles and electric cars, and military equipment and aerospace fields. With the continuous expansion of the application field of the power batteries, the market demand is also constantly expanding.

The inventors have noticed that with the charging and discharging cycle of the battery, battery cells in the battery radiate heat, and the accumulation of heat leads to a too high use temperature of the battery cells, which will seriously affect the service life of the battery. Moreover, the continuous high temperature state is extremely likely to cause thermal runaway of the battery, causing incalculable losses and endangering personal safety.

In order to alleviate the problem of accumulation of heat from the battery cells, the applicants have found that it is possible to provide a battery cell holder at the concentrated position of the battery cells in the battery, to provide a heat dissipation channel with two ends open in the battery cell holder, and to arrange the battery cells around an outer surface of the battery cell holder on a peripheral side of the heat dissipation channel. For example, the battery cell holder is of a hollow structure, and the battery cells are fixed to an outer wall of the battery cell holder. When the battery cells radiate heat, the heat flows away through the heat dissipation channel under the natural flow of air.

Based on the above considerations, in order to solve the battery safety problem caused by the accumulation of heat during the use of the battery cells, the inventors have designed a battery cell holder through in-depth research, in which the heat radiated from the battery cells is taken away through a heat dissipation channel in the battery cell holder, thereby reducing the amount of heat accumulated during the use of the battery.

The battery cell holder disclosed in the embodiments of the present application may be connected to battery cells to form a battery module. The battery module may be, but is not limited to being, used in an electrical apparatus such as a vehicle, a ships, or an aircraft, and a power supply system of the electrical apparatus is formed by using a battery provided with the battery module. This helps the heat dissipation of the battery, improves the safety of the battery, and prolongs the service life of the battery.

Examples of the present application provide an electrical apparatus that uses a battery as a power supply, and the electrical apparatus may be, but is not limited to, a mobile phone, a tablet, a laptop, an electric toy, an electric tool, a battery vehicle, an electric vehicle, a ship, a spacecraft, and so on. The electric toy may include fixed or mobile electric toys, such as game consoles, electric car toys, electric ship toys, electric airplane toys, and the like. The spacecraft may include airplanes, rockets, space shuttles, spaceships, and the like.

Hereinafter, for the convenience of illustration, a vehicle 1000 is taken as an example to describe an electrical apparatus according to an embodiment of the present application.

Please refer to FIG. 1, which is a schematic structural diagram of a vehicle 1000 according to some embodiments of the present application. The vehicle 1000 may be a fuel vehicle, a gas vehicle or a new-energy vehicle. The new-energy vehicle may be an all-electric vehicle, a hybrid vehicle, an extended-range electric vehicle, etc. The interior of the vehicle 1000 is provided with a battery 100. The battery 100 may be provided at the bottom or head or tail of the vehicle 1000. The battery 100 may be used to power the vehicle 1000. For example, the battery 100 may be used as an operating power source of the vehicle 1000. The vehicle 1000 may further include a controller 200 and a motor 300. The controller 200 is used to control the battery 100 to power the motor 300. For example, the controller 200 is used for meeting the operating power demand when the vehicle 1000 is starting, navigating and driving.

In some embodiments of the present application, the battery 100 not only may serve as an operating power source of the vehicle 1000, but also may serve as a driving power source of the vehicle 1000, thus replacing or partially replacing fuel or natural gas to provide driving power for the vehicle 1000.

Figure 2:
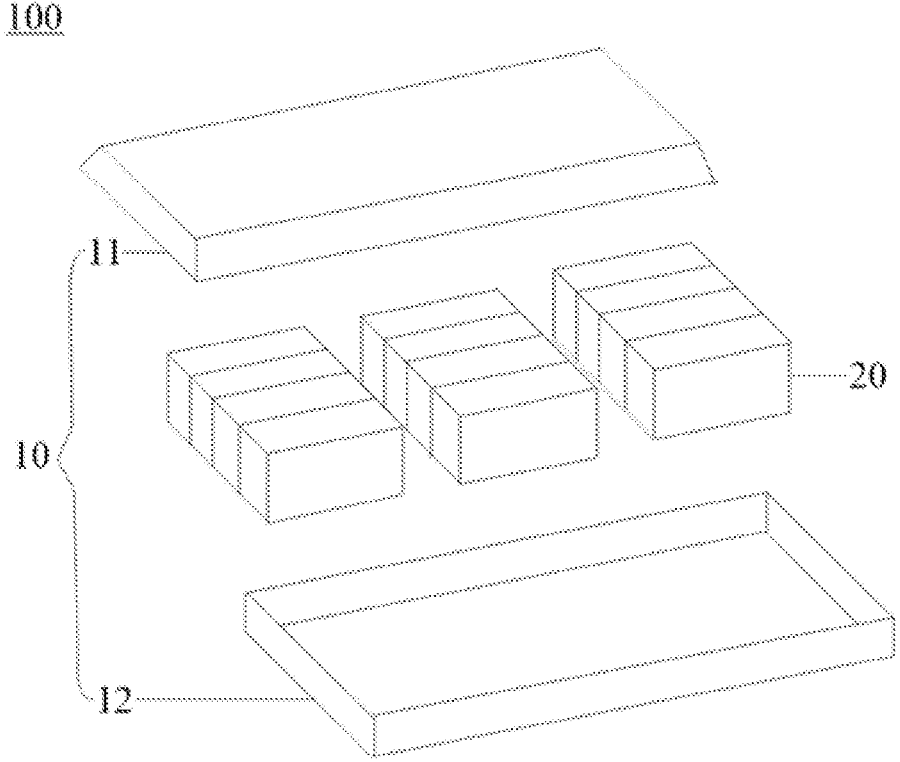
FIG. 2 is an exploded schematic structural diagram of a battery according to some embodiments of the present application.

Please refer to FIG. 2, which is an exploded view of a battery 100 according to some embodiments of the present application. The battery 100 includes a box body 10 and a battery module 20. The battery module 20 is accommodated within the box body 10. Here, the box body 10 is used to provide an accommodating space for the battery module 20, and the box body 10 may be of various structures. In some embodiments, the box body 10 may include a first part 11 and a second part 12. The first part 11 and the second part 12 are covered by each other, and the first part 11 and the second part 12 together define an accommodating space for accommodating the battery module 20. The second part 12 may be a hollow structure with one end open, the first part 11 may be a plate-like structure, and the first part 11 covers the opening side of the second part 12, so that the first part 11 and the second part 12 together define the accommodating space. It is also possible that each of the first part 11 and the second part 12 is a hollow structure with one side open, and the opening side of the first part 11 covers the opening side of the second part 12. Of course, the box body 10 formed by the first part 11 and the second part 12 can be of various shapes, such as a cylinder or a cuboid.

In the battery 100, there may be a plurality of battery modules 20, and the plurality of battery modules 20 may be connected in series or parallel or series-parallel connection, wherein the series-parallel connection means that the plurality of battery modules 20 are connected in both series and parallel. The plurality of battery modules 20 may be directly connected in series or parallel or series-parallel connection, and then an entirety composed of the plurality of battery modules 20 may be accommodated in the box body 10. The battery 100 may further include other structures. For example, the battery 100 may further include a bus component for electrically connecting the plurality of battery modules 20.

Figure 3:
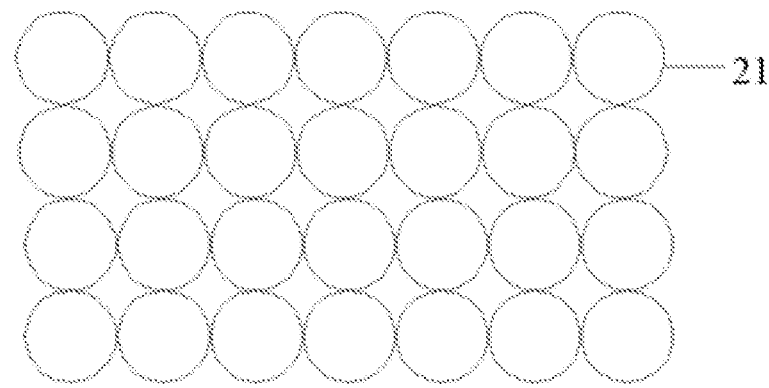
FIG. 3 is a schematic structural diagram of a battery module according to some embodiments of the present application.

Please refer to FIG. 3, which is a top view of a battery module 20 according to some embodiments of the present application. The battery module 20 includes a battery cell 21. In the battery module 20, there may be a plurality of battery cells 21, and the plurality of battery cells 21 may be connected in series or parallel or series-parallel connection, wherein the series-parallel connection means that the plurality of battery cells 21 are connected in both series and parallel. The plurality of battery cells 21 may be directly connected in series or parallel or series-parallel connection, and then an entirety composed of the plurality of battery cells 21 may be accommodated in the box body 10.

Each battery cell 21 may be a secondary battery or a primary battery; or may be a lithium-sulfur battery, a sodium-ion battery or a magnesium-ion battery, but is not limited thereto. The battery cell 21 may be in the shape of a cylinder, a flat body, a cuboid or others.

Figure 4:
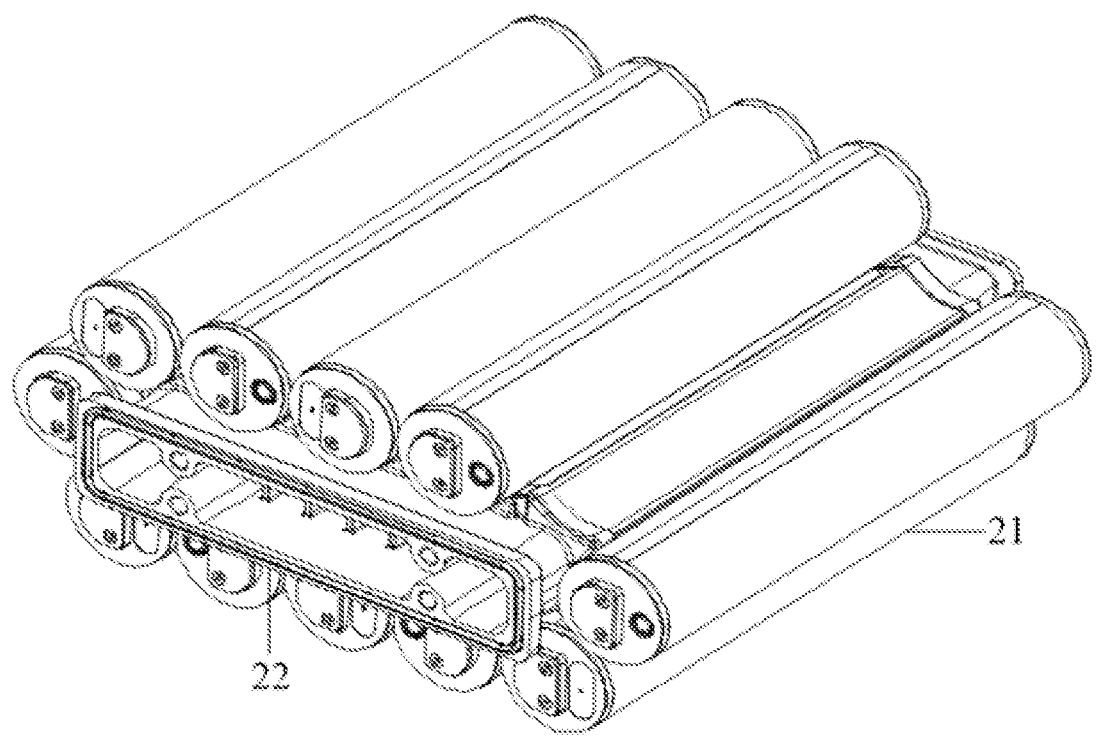
FIG. 4 is a schematic structural diagram of a battery module according to some embodiments of the present application.
Figure 5:
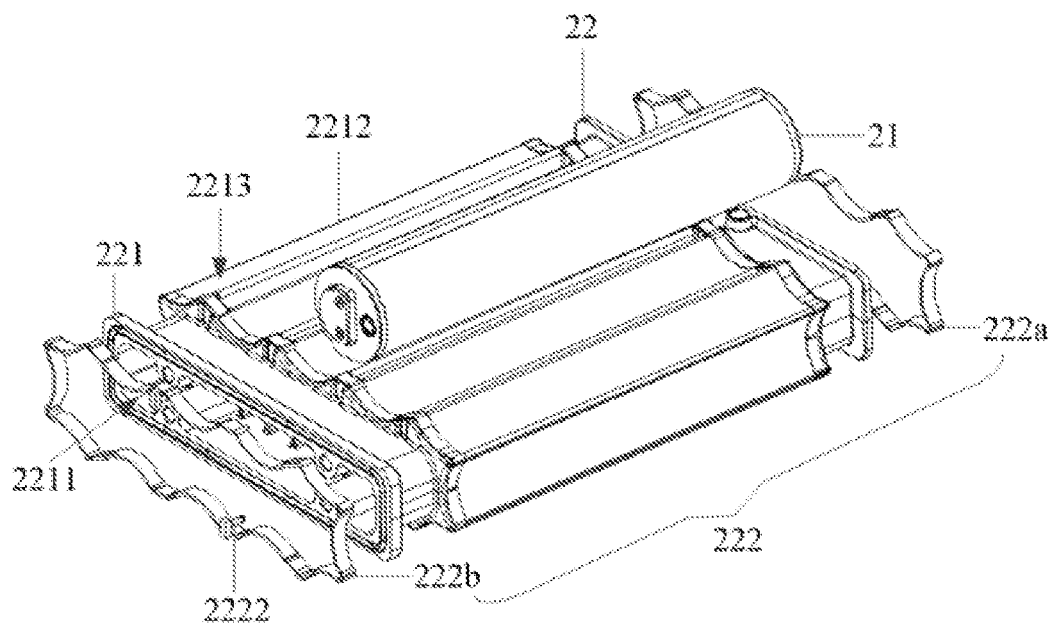
FIG. 5 is an exploded schematic structural diagram of a battery module according to some embodiments of the present application.
Figure 6:
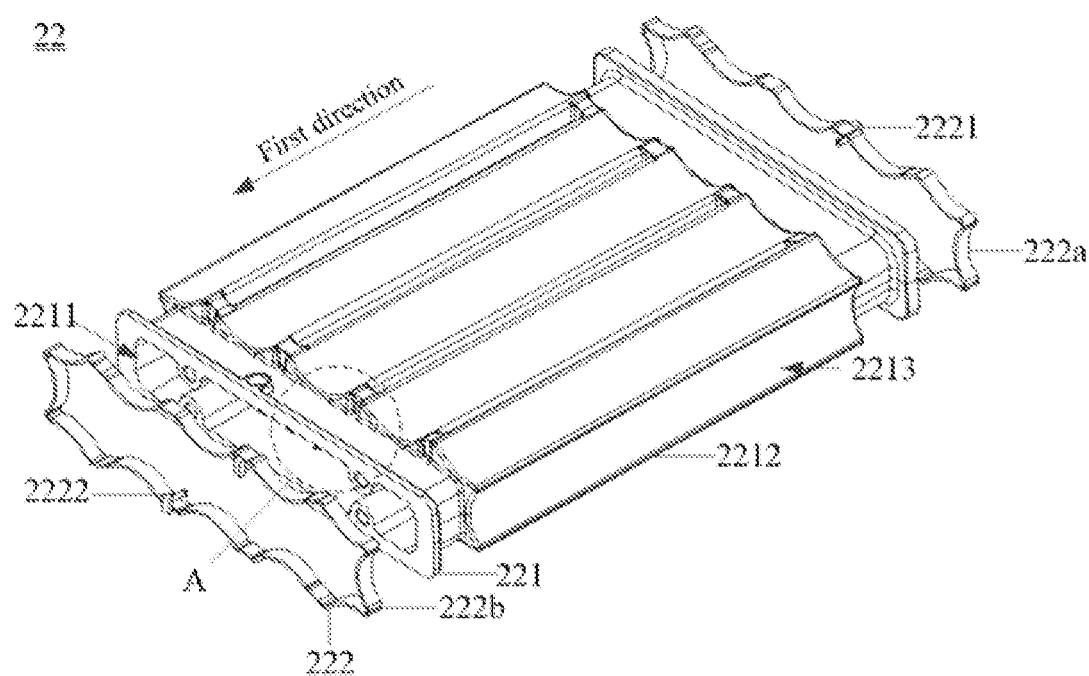
FIG. 6 is an exploded schematic structural diagram of a battery cell holder according to some embodiments of the present application.
Figure 7:
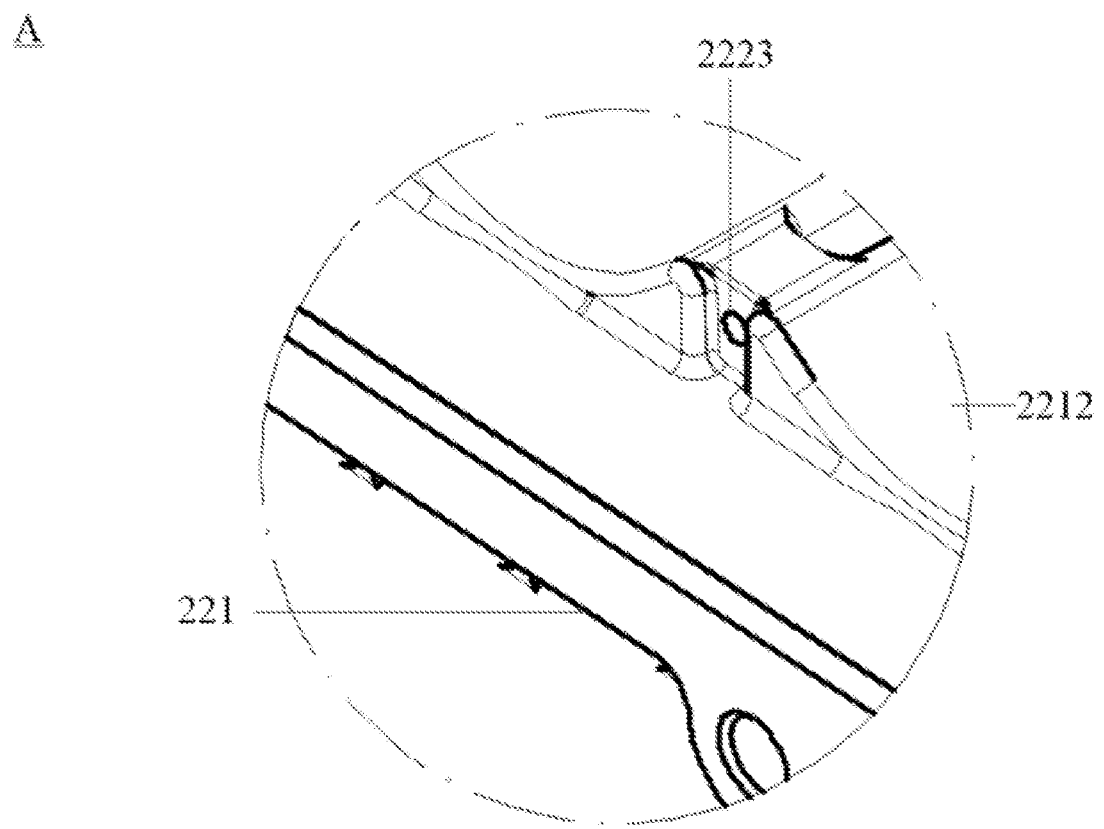
FIG. 7 is an enlarged schematic structural diagram of the area A of a battery cell holder according to some embodiments of the present application.
Figure 8:
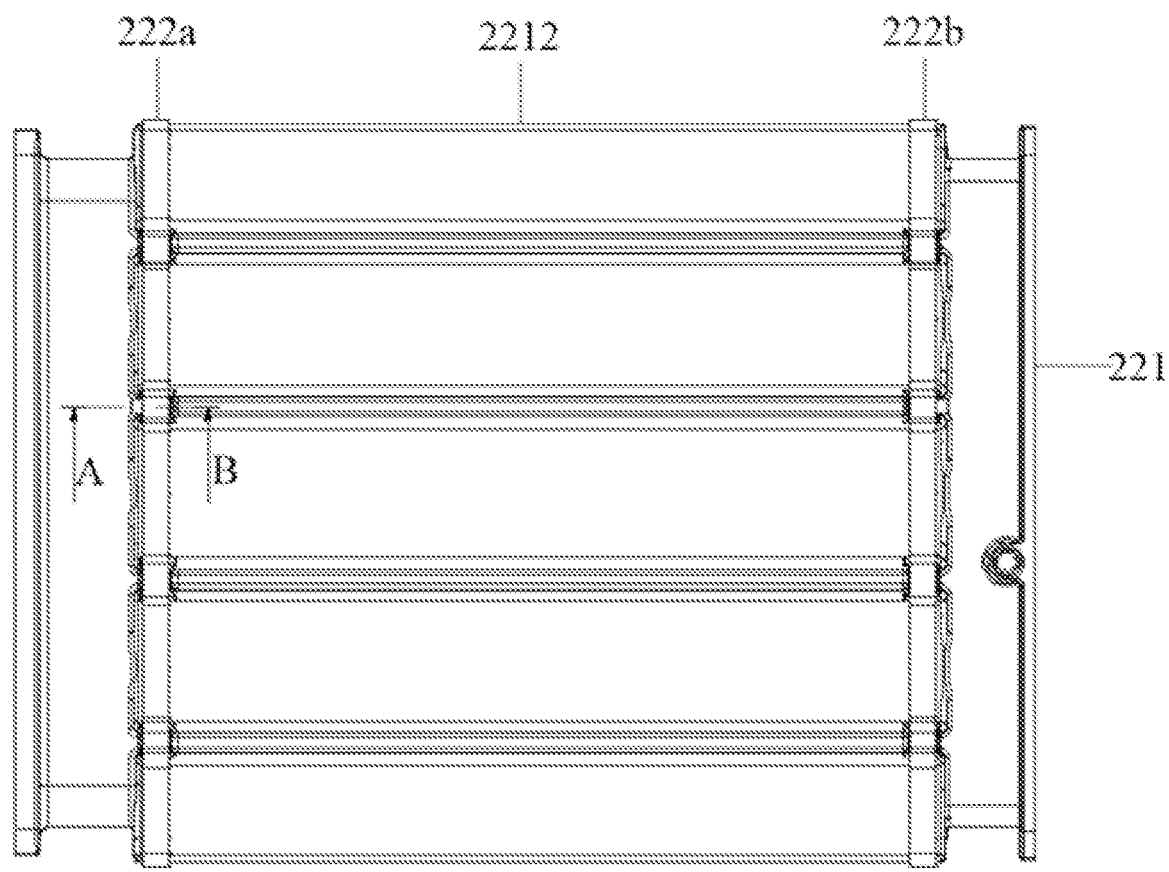
FIG. 8 is a schematic structural diagram of a battery cell holder according to some embodiments of the present application.
Figure 9:
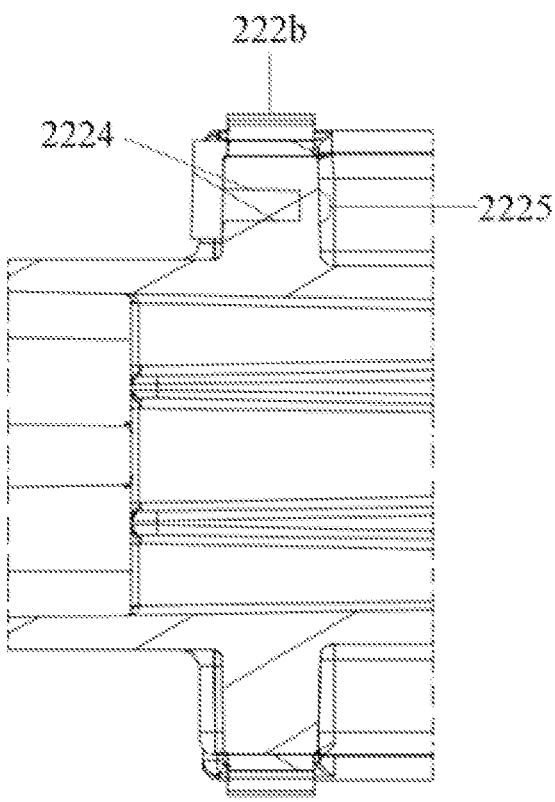
FIG. 9 is a cross-sectional schematic structural diagram of a battery cell holder according to some embodiments of the present application along the line A-B.
Figure 10:
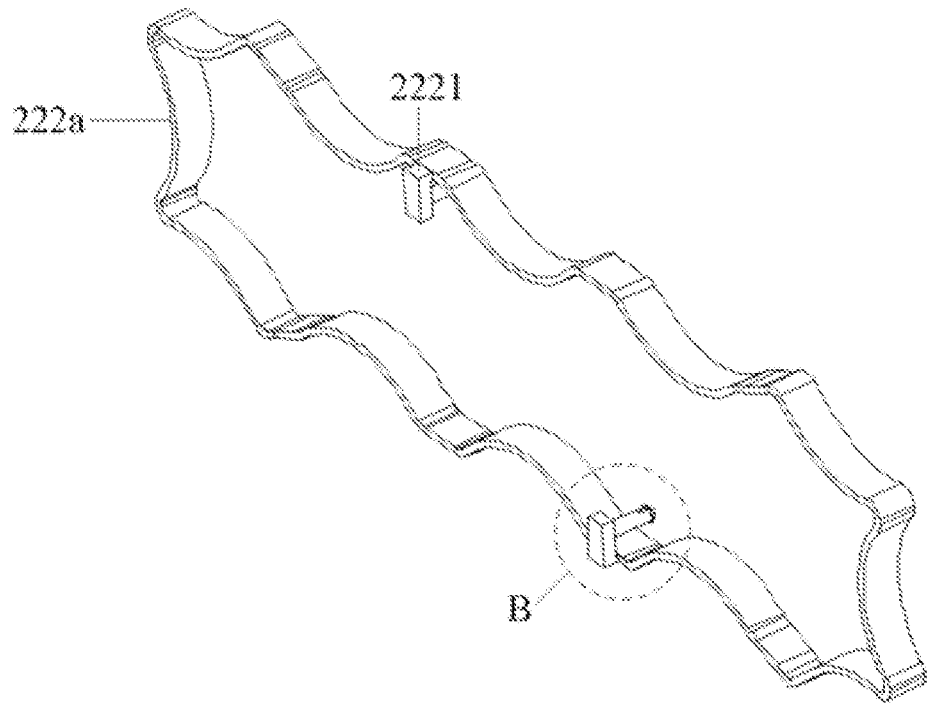
FIG. 10 is a schematic structural diagram of a first insulating strip of a battery cell holder according to some embodiments of the present application.
Figure 11:
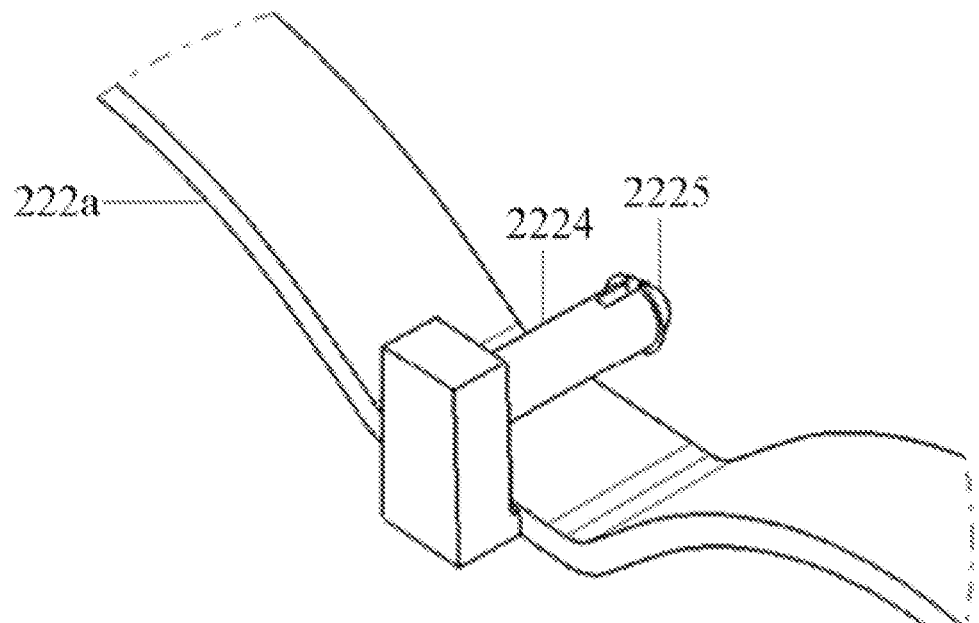
FIG. 11 is an enlarged schematic structural diagram of the area B of a battery cell holder according to some embodiments of the present application.
Figure 12:
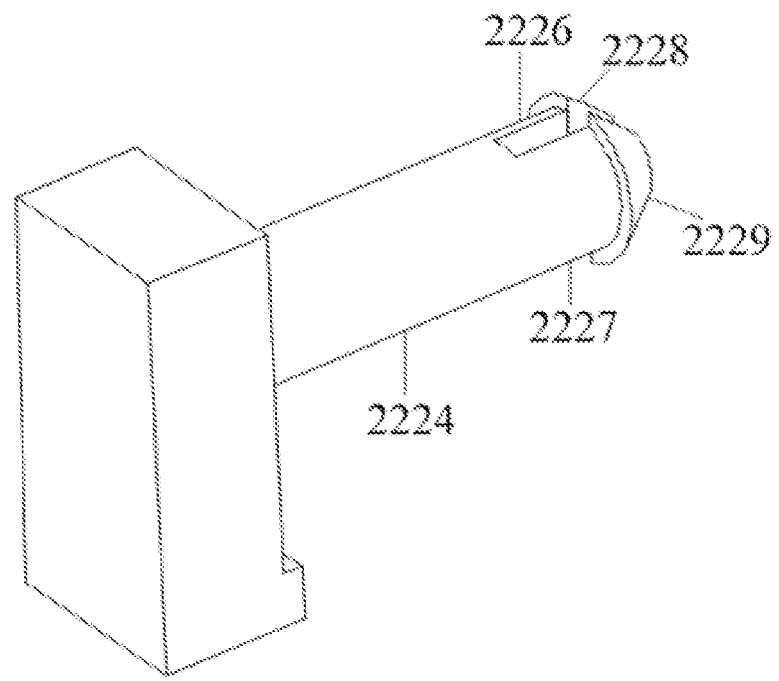
FIG. 12 is a partial enlarged schematic structural diagram of the area B of a battery cell holder according to some embodiments of the present application.

According to some embodiments of the present application, referring to FIG. 4, and further referring to FIGS. 5 to 12, FIG. 4 is a schematic structural diagram of a battery module provided by some embodiments of the present application, FIG. 5 is an exploded schematic structural diagram of a battery module provided by some embodiments of the present application, FIG. 6 is an exploded schematic structural diagram of a battery cell holder provided by some embodiments of the present application, FIG. 7 is an enlarged schematic structural diagram of the area A of a battery cell holder provided by some embodiments of the present application, FIG. 8 is a schematic structural diagram of a battery cell holder provided by some embodiments of the present application, FIG. 9 is a cross-sectional schematic structural diagram of a battery cell holder provided by some embodiments of the present application along the line A-B, FIG. 10 is a schematic structural diagram of a first insulating strip of a battery cell holder provided by some embodiments of the present application, FIG. 11 is an enlarged schematic structural diagram of the area B of a battery cell holder provided by some embodiments of the present application, and FIG. 12 is a partial enlarged schematic structural diagram of the area B of a battery cell holder provided by some embodiments of the present application. The present application provides a battery cell holder 22. A battery module 20 is formed after the battery cell holder 22 fixes a battery cell 21. The battery cell holder 22 includes a holder body 221 and an insulating member 222. The holder body 221 is provided with at least one first channel 2211 in a first direction, and the insulating member 222 is arranged on an outer surface of the holder body 221. The insulating member 222 covers part or all of the outer surface, and the surface of the insulating member 222 facing away from the holder body 221 can fix the battery cell 21.

The holder body 221 is provided with at least one first channel 2211 in the first direction. The first channel 2211 refers to a channel with two ends open. That is to say, two ends of the first channel 2211 in the first direction are respectively provided with a first opening and a second opening. Here, the first channel 2211 forms the heat dissipation channel of the battery cell holder 22. An inner wall of the first channel 2211 may be a smooth curved inner wall, a smooth polygonal inner wall, a honeycomb relief inner wall, or an inner wall of other shapes, which will not be specifically limited here.

The holder body 221 is provided with at least one first channel 2211 in the first direction. In other words, the holder body 221 may be provided with one first channel 2211 in the first direction, or may be provided with a plurality of first channels 2211 in the first direction. For example, as shown in FIG. 6, the holder body 221 is provided with one first channel 2211 in the first direction to form a hollow holder body 221. When a plurality of first channels 2211 are provided, the dimensions of the plurality of first channels 2211 may be the same or different from each other in a second direction perpendicular to the first direction. When a plurality of first channels 2211 are provided, the plurality of first channels 2211 may be arranged evenly or unevenly.

The insulating member 222 refers to a structural member made of an insulating material, which is arranged on the outer surface of the holder body 221. That is, the insulating member 222 is arranged on the surface of the holder body 221 facing away from the first channel 2211. The insulating member 222 covering part or all of the outer surface means that part or all of the surface of the holder body 221 facing away from the first channel 2211 is provided with the insulating member 222, and the surface of the insulating member 222 facing away from the holder body 221 can fix the battery cell 21, so that electricity can be prevented from being conducted from the battery cell 21 to the holder body 221.

By providing the holder body with the first channel, and fixing the battery cell to the holder body on the peripheral side of the first channel, after the battery cell radiates heat, the heat flows out through the first channel, so that the temperatures of the battery cell itself and the environment surrounding the battery cell can be reduced, thereby alleviating the battery safety problem caused by the accumulation of heat during the use of the battery.

According to some embodiments of the present application, optionally, still referring to FIGS. 6 to 8, the outer surface of the holder body 221 is provided with a connecting portion 2212 around the first direction, and the surface of the connecting portion 2212 facing away from the holder body 221 is a connecting surface recessed to form at least one accommodating recess 2213. An inner wall of the accommodating recess 2213 has a shape adapted to that of a partial surface of the battery cell 21, and the insulating member 222 is arranged on the surface of the connecting portion 2212 facing away from the holder body 221.

The connecting portion 2212 being arranged in a circle on the outer surface of the holder body 221 around the first direction means that the connecting portion 2212 extends circumferentially around the first direction. The connecting surface is recessed to form at least one accommodating recess 2213, and an inner wall of the accommodating recess 2213 has a shape adapted to that of a partial surface of the battery cell 21. That is, if the battery cell 21 is placed in the accommodating recess 2213, the battery cell 21 can be fitted to the inner wall of the accommodating recesses 2213. Here, the battery cell 21 may be fixed in the accommodating recesses 2213 by means of an insulating adhesive.

By configuring the shape of the accommodating recess to be adapted to the shape of the partial surface of the battery cell, when the battery cell is fixed in the accommodating recess, there is no gap between the battery cell and the holder body, so that the connection between the battery cell and the battery cell holder is stronger.

According to some embodiments of the present application, optionally, still referring to FIGS. 6 to 8, the accommodating recess 2213 is in the shape of an elongated strip in the first direction, and the accommodating recess 2213 is in the shape of a recessed arc surface around the first direction; and/or the connecting portion 2212 is provided with a plurality of accommodating recesses 2213, and the plurality of accommodating recesses 2213 are evenly distributed on the connecting surface of the connecting portion 2212.

The accommodating recess 2213 being in the shape of an elongated strip in the first direction and the accommodating recess 2213 being in the shape of a recessed arc surface around the first direction means that the shape of the inner wall of the accommodating recess 2213 is adapted to that of a partial surface of the cylindrical battery cell 21, so that the battery cell holder 22 in this embodiment can be adapted to connect the cylindrical battery cell 21.

The connecting portion 2212 being provided with a plurality of accommodating recesses 2213 and the plurality of accommodating recesses 2213 being evenly distributed on the connecting surface of the connecting portion 2212 means that the outer surface of one battery cell holder 22 can fix a plurality of battery cells 21, and the plurality of battery cells 21 can be arranged evenly.

By configuring the accommodating recess in the shape of an elongated strip in the first direction, and the accommodating recess is in the shape of a recessed arc surface around the first direction, the battery cell holder can be adapted to connect a cylindrical battery cell, and can fix the cylindrical battery cell more firmly. By providing the connecting portion with a plurality of accommodating recesses evenly distributed on the outer surface of the connecting portion, the battery cell holder can fix a plurality of battery cells, and after the plurality of battery cells are fixed, the heat dissipation effect is more uniform and the visual effect is good.

According to some embodiments of the present application, optionally, still referring to FIGS. 6 to 8, the connecting portion 2212 is a heat conducting member; and/or the connecting portion 2212 is integrally formed with the holder body 221; and/or a second channel extending in the first direction is provided between the connecting portion 2212 and the holder body 221.

The connecting portion 2212 being a heat conducting member means that the connecting portion 2212 is made of a material with thermal conductivity. For example, the connecting portion 2212 is made of an aluminum material, so that the heat radiated from the battery cell 21 fixed to the battery cell holder 22 can be conducted more and faster to the connecting portion 2212 close to the first channel 2211 and then taken away through the first channel 2211, so as to further reduce the temperatures of the battery cell 21 itself that is fixed to the battery cell holder 22 and the environment surrounding the battery cell 21.

The connecting portion 2212 is integrally formed with the holder body 221, for example, the connecting portion 2212 and the holder body 221 are integrally injection-molded, and the integral forming can increase the structural strength of the connecting portion 2212 and the holder body 221 after being connected.

A second channel extending in the first direction is provided between the connecting portion 2212 and the holder body 221, the second channel is a channel with two ends open, and the number of second channels may be one or plural. When the battery cell 21 fixed to the battery cell holder 22 radiates heat, the heat can be dissipated through the second channel and the first channel at the same time, so that the temperatures of the battery cell 21 itself that is fixed to the battery cell holder 22 and the environment surrounding the battery cell 21 can be further reduced.

By configuring the connecting portion as a heat conducting member, the heat radiated from the battery cell fixed to the battery cell holder can be conducted more and faster to the connecting portion close to the first channel, and then dissipated through the first channel, so that the temperatures of the battery cell itself that is fixed to the battery cell holder and the environment surrounding the battery cell can be further reduced. By integrally forming the connecting portion with the holder body, the structural strength of the battery cell holder can be increased. By providing a second channel, which extends in the first direction, between the connecting portion and the holder body, the heat radiated from the battery cell fixed to the battery cell holder can be simultaneously dissipated through the first channel and the second channel, so that the temperatures of the battery cell itself that is fixed to the battery cell holder and the environment surrounding the battery cell can be further reduced.

According to some embodiments of the present application, optionally, still referring to FIGS. 6 to 8, the insulating member 222 includes: a first insulating strip 222*a* and a second insulating strip 222*b*. The first insulating strip 222*a* is arranged in a circle around the connecting surface on the peripheral side of the connecting portion 2212, the second insulating strip 222*b* is arranged in a circle around the connecting surface on the peripheral side of the connecting portion 2212, and the second insulating strip 222*b* and the first insulating strip 222*a* are spaced apart from each other.

The first insulating strip 222*a* and the second insulating strip 222*b* are arranged on the outer surface of the connecting portion 2212 and are spaced apart from each other in the first direction. When the battery cell 21 is being assembled, the space between the first insulating strip 222*a* and the second insulating strip 222*b* may be filled with an insulating adhesive to fix the battery cells 21 to the battery cell holder 22. Here, the insulating adhesive can not only provide an insulating function, but can also realize the connection between the battery cell 21 and the connecting surface of the connecting portion 2212. Moreover, since the insulating adhesive is in a flowing state after being filled, the insulating adhesive can be flush with the corresponding positions of the first insulating strip 222*a* and the second insulating strip 222*b* through the pressing of the battery cell 21, so that the battery cell 21 extends in the first direction after being fixed. Of course, an insulating pad may also be placed between the first insulating strip 222*a* and the second insulating strip 222*b* to achieve insulation between the battery cell 21 and the connecting portion 2212.

The battery cell can be separated from the holder body by means of the first insulating strip and the second insulating strip, so that the holder body can be prevented from being electrified.

According to some embodiments of the present application, optionally, still referring to FIGS. 6 to 8, the surface of the first insulating strip 222*a* facing away from the connecting portion 2212 is recessed to form a first fixing recess adapted in shape to a partial surface of the battery cell 21, and the surface of the second insulating strip 222*b* facing away from the connecting portion 2212 is recessed to form a second fixing recess adapted in shape to a partial surface of the battery cell 21.

The shape of the first fixing recess is adapted to that of the partial surface of the battery cell 21. After the battery cell 21 is fixed to the battery cell holder 22, the partial surface of the battery cell 21 is fitted with the first fixing recess. Similarly, the partial surface of the battery cell 21 is fitted with the second fixing recess. The surface of the first insulating strip 222*a* facing away from the connecting portion 2212 may be provided with a plurality of first fixing recesses to fix a plurality of battery cells 21, and similarly, the surface of the second insulating strip 222*b* facing away from the connecting portion 2212 may be provided with a plurality of second fixing recesses to fix the plurality of battery cells 21. Here, the first fixing recesses correspond to the accommodating recesses 2213, and the second fixing recesses correspond to the accommodating recesses 2213. For example, referring to FIG. 6, the first insulating strip 222*a* and the second insulating strip 222*b* are respectively provided with a plurality of first fixing recesses and a plurality of second fixing recesses, and two ends of one accommodating recess 2213 respectively correspond to one first fixing recess and one second fixing recess, so that the first fixing recess, the accommodating recess 2213 and the second fixing recess extending in the first direction can cooperate with each other to fix one battery cell 21.

By adapting the first fixing recess on the first insulating strip and the second fixing recess on the second insulating strip in shape to a partial surface of the battery cell, after the battery cell is fixed to the battery cell holder, there is no gap between the battery cell and the first insulating strip and the second insulating strip, so that the structural stability of the battery cell and the battery cell holder can be improved.

According to some embodiments of the present application, optionally, still referring to FIGS. 6 to 11, the two ends of the connecting portion 2212 in the first direction are respectively provided with a first snap-fit portion 2214, and the first insulating strip 222*a* is provided with a second snap-fit portion 2221, and the second insulating strip is provided with a third snap-fit portion 2222. The second snap-fit portion 2221 and the third snap-fit portion 2222 are respectively snap-fitted with the first snap-fit portions at the two ends of the connecting portion 2212.

The first insulating strip can be fixed to one end of the connecting portion by snap-fitting the second snap-fit portion with the first snap-fit portion at one end of the connecting portion, and the second insulating strip can be fixed to the other end of the connecting portion by snap-fitting the third snap-fit portion with the first snap-fit portion at the other end of the connecting portion. Moreover, a high connection efficiency between the insulating member and the connecting portion is achieved by means of snap-fit.

According to some embodiments of the present application, optionally, still referring to FIGS. 6 to 11, the first snap-fit portions are snap-fit through holes; and the second snap-fit portion 2221 and the third snap-fit portion 2222 are both snap-fit posts, and a free end of each snap-fit post is provided with a hooking portion.

The connecting portion 2212 has a first end face and a second end face opposite to each other in the first direction, the first end face is connected to the second end face via the connecting surface, and two ends of the connecting portion 2212 are respectively provided with a first snap-fit through hole and a second snap-fit through hole 2223. The first snap-fit through hole communicates the first end face with the connecting surface, and the second snap-fit through hole 2223 communicates the second end face with the connecting surface. A first snap-fit post of the second snap-fit portion 2221 extends into an opening of the first snap-fit through hole on the first end face side and out of an opening on the other side of the first snap-fit through hole, and a first hooking portion on the first snap-fit post of the second snap-fit portion 2221 extends out of the opening on the other side of the first snap-fit through hole and is snap-fitted with the edge at this opening, so as to snap-fit the second snap-fit portion 2221 with the first snap-fit through hole. A second snap-fit post 2224 of the third snap-fit portion 2222 extends into an opening of the second snap-fit through hole 2223 on the second end face side and out of an opening on the other side of the second snap-fit through hole 2223, and a second hooking portion 2225 on the second snap-fit post 2224 of the third snap-fit portion 2222 extends out of the opening on the other side of the second snap-fit through hole 2223 and is snap-fitted with the edge at this opening, so as to snap-fit the third snap-fit portion 2221 with the second snap-fit through hole 2223.

The fast connection between the first insulating strip, the second insulating strip and the connecting portion can be realized through the cooperation of the snap-fit through holes, the snap-fit posts and the hooking portions on the snap-fit posts, so that the assembly efficiency of the battery cell holder can be improved.

According to some embodiments of the present application, optionally, still referring to FIGS. 11 and 12, the free end of each snap-fit post is provided with a notch to form a first sub-end 2226 and a second sub-end 2227 opposite each other, a first sub-hooking portion 2228 and a second sub-hooking portion 2229 respectively protrude from the surfaces of the first sub-end 2226 and the second sub-end 2227 facing away from each other, and when the snap-fit post extends into a respective snap-fit through hole, the first sub-hooking portion 2228 and the second sub-hooking portion 2229 are exposed and respectively hooked to an outer edge of the snap-fit through hole. Here, the first sub-hooking portion 2228 and the second sub-hooking portion 2229 are of a hooking portion structure, and of course, may of be of other structures in specific implementation.

According to some embodiments of the present application, optionally, still referring to FIG. 6, the holder body 221 is a heat conducting member; and/or two ends of the holder body 221 in the first direction are respectively provided with a first flange and a second flange. The first flange is provided with a first connecting structure, and the second flange is provided with a second connecting structure.

The holder body 221 being a heat conducting member means that the holder body 221 is made of a material with thermal conductivity. Two ends of the holder body 221 in the first direction are respectively provided with a first flange and a second flange, the first flange is provided with a first connecting structure and the second flange is provided with a second connecting structure. Here, the battery cell holder 22 can be fixed within the holder body by means of the first connecting structure and the second connecting structure.

By configuring the holder body as a heat conducting member, the heat of the battery cell itself that is fixed to the battery cell holder and the surrounding environment can be conducted to the holder body more and faster and then dissipated through the first channel in the holder body. The battery cell holder can be fixed in the box body of the battery module more conveniently by means of the first connecting structure of the first flange and the second connecting structure of the second flange.

According to some embodiments of the present application, referring to FIGS. 4 and 5, FIG. 4 is a schematic structural diagram of a battery module provided by some embodiments of the present application, and FIG. 5 is an exploded schematic structural diagram of a battery module provided by some embodiments of the present application. The present application also provides a battery module 20, including a battery cell 21 and the battery cell holder 22 described in any of the above solutions, wherein the battery cell 21 is connected to the surface of the insulating member 222 of the battery cell holder 22 facing away from the holder body 221.

According to some embodiments of the present application, the present application further provides a battery 100 including the battery module described in any one of the above solutions.

According to some embodiments of the present application, the present application further provides an electrical apparatus including the battery described in any one of the above solutions.

According to some embodiments of the present application, referring to FIGS. 4 to 12, the present application provides a battery module 20. The battery module 20 includes a battery cell 21 and a battery cell holder 22. The battery cell 21 is a cylindrical battery cell. The battery cell holder 22 includes a holder body 221, a connecting portion 2212 and an insulating member 222. The holder body 221 is provided with a first channel 2211 in a first direction. The connecting portion 2212 is arranged in a circle on an outer surface of the holder body 221 around the first direction and is integrally formed with the holder body 221, and the connecting surface is recessed to form a plurality of accommodating recesses 2213 around the first direction. An inner wall of the accommodating recess 2213 has a shape adapted to that of a partial surface of the battery cell 21.

The insulating member 222 includes a first insulating strip 222a and a second insulating strip 222b. The first insulating strip 222a is arranged in a circle around the outer surface on the peripheral side of the connecting portion 2212, the second insulating strip 222b is arranged in a circle around the outer surface on the peripheral side of the connecting portion 2212, the second insulating strip 222b and the first insulating strip 222a are respectively arranged on the side of the connecting portion 2212 facing away from the holder body 221 and at two ends in the first direction, the surfaces of the first insulating strip 222a and the second insulating strip 222b facing away from the connecting portion 2212 are both adapted to the partial surface of the battery cell 21, and the first insulating strip 222a and the second insulating strip 222b are respectively snap-fitted with the connecting portions 2212. An insulating adhesive is filled between the first insulating strip 222a and the second insulating strip 222b to fix and insulate the battery cell 21.

Finally, it should be noted that the above embodiments are merely used for illustrating rather than limiting the technical solutions of the present application. Although the present application has been described in detail with reference to the above various embodiments, those of ordinary skill in the art should understand that the technical solutions specified in the above various embodiments can still be modified, or some or all of the technical features therein can be equivalently substituted; and such modifications or substitutions do not make the essence of the corresponding technical solutions depart from the scope of the technical solutions of the various embodiments of the present application, which shall fall within the scope of the claims and the specification of the present application. In particular, the technical features mentioned in the various embodiments can be combined in any manner as long as there is no structural conflict. The present application is not limited to the specific embodiments disclosed herein, but rather includes all technical solutions falling within the scope of the claims.

What is claimed is:

1. A battery cell holder, comprising:
   a holder body provided with at least one first channel in a first direction;
   an insulating member arranged on an outer surface of the holder body, wherein the insulating member covers part or all of the outer surface, and the surface of the insulating member facing away from the holder body is capable of fixing a battery cell; wherein
   the outer surface of the holder body is provided with a connecting portion around the first direction, the surface of the connecting portion facing away from the holder body is a connecting surface recessed to form at least one accommodating recess, and an inner wall of the accommodating recess has a shape adapted to that of a partial surface of the battery cell;
   the insulating member is arranged on the surface of the connecting portion facing away from the holder body; and a second channel extending in the first direction is provided between the connecting portion and the holder body.

2. The battery cell holder according to claim 1, wherein the accommodating recess is in the shape of an elongated strip in the first direction, and the accommodating recess is in the shape of a recessed arc surface around the first direction; and/or
the connecting portion is provided with a plurality of accommodating recesses evenly distributed on the connecting surface of the connecting portion.

3. The battery cell holder according to claim 1, wherein the connecting portion is a heat conducting member.

4. The battery cell holder according to claim 1, wherein the connecting portion is integrally formed with the holder body.

5. The battery cell holder according to claim 1, wherein the connecting portion has a first end face and a second end face opposite to each other in the first direction, the first end face is connected to the second end face via the connecting surface, and two ends of the connecting portion are respectively provided with a first snap-fit through hole and a second snap-fit through hole, wherein the first snap-fit through hole communicates the first end face with the connecting surface, and the second snap-fit through hole communicates the second end face with the connecting surface.

6. The battery cell holder according to claim 1, wherein the insulating member comprises a first insulating strip and a second insulating strip, wherein the first insulating strip is arranged in a circle around the connecting surface on the peripheral side of the connecting portion, the second insulating strip is arranged in a circle around the connecting surface on the peripheral side of the connecting portion, and the second insulating strip and the first insulating strip are spaced apart from each other.

7. The battery cell holder according to claim 6, wherein the surface of the first insulating strip facing away from the connecting portion is recessed to form a first fixing recess adapted in shape to a partial surface of the battery cell, and the surface of the second insulating strip facing away from the connecting portion is recessed to form a second fixing recess adapted in shape to a partial surface of the battery cell.

8. The battery cell holder according to claim 6, wherein the two ends of the connecting portion in the first direction are respectively provided with a first snap-fit portion, the first insulating strip is provided with a second snap-fit portion, the second insulating strip is provided with a third snap-fit portion, and the second snap-fit portion and the third snap-fit portion are respectively snap-fitted with the first snap-fit portions at the two ends of the connecting portion.

9. The battery cell holder according to claim 8, wherein the first snap-fit portions are snap-fit through holes; and the second snap-fit portion and the third snap-fit portion are both snap-fit posts, and a free end of each snap-fit post is provided with a hooking portion.

10. The battery cell holder according to claim 9, wherein the free end of each snap-fit post is provided with a notch to form a first sub-end and a second sub-end opposite each other, a first sub-hooking portion and a second sub-hooking portion respectively protrude from the surfaces of the first sub-end and the second sub-end facing away from each other, and when the snap-fit post extends into a respective snap-fit through hole, the first sub-hooking portion and the second sub-hooking portion are exposed and respectively hooked to an outer edge of the snap-fit through hole.

11. The battery cell holder according to claim 8, wherein a first snap-fit post of the second snap-fit portion extends into an opening of the first snap-fit through hole on the first end face side and out of an opening on the other side of the first snap-fit through hole, and a first hooking portion on the first snap-fit post of the second snap-fit portion extends out of the opening on the other side of the first snap-fit through hole and is snap-fitted with the edge at this opening, so as to snap-fit the second snap-fit portion with the first snap-fit through hole on the first end face side.

12. The battery cell holder according to claim 8, wherein a second snap-fit post of the third snap-fit portion extends into an opening of the second snap-fit through hole on the second end face side and out of an opening on the other side of the second snap-fit through hole, and a second hooking portion on the second snap-fit post of the third snap-fit portion extends out of the opening on the other side of the second snap-fit through hole and is snap-fitted with the edge at this opening, so as to snap-fit the third snap-fit portion with the second snap-fit through hole on the second end face side.

13. The battery cell holder according to claim 1, wherein the holder body is a heat conducting member.

14. The battery cell holder according to claim 1, wherein two ends of the holder body in the first direction are respectively provided with a first flange and a second flange, wherein the first flange is provided with a first connecting structure, and the second flange is provided with a second connecting structure.

15. A battery module, comprising:
a battery cell and the battery cell holder according to claim 1, wherein the battery cell is connected to the surface of the insulating member of the battery cell holder facing away from the holder body.

16. The battery module according to claim 15, wherein a plurality of battery cells are provided, wherein the plurality of battery cells are connected in a series, parallel, or hybrid manner.

17. A battery, comprising:
the battery module according to claim 15.

18. The battery according to claim 17, wherein a plurality of battery modules are provided, wherein the plurality of battery modules are connected in a series, parallel, or hybrid manner.

19. The battery according to claim 17, wherein the battery module is accommodated in a box body.

20. An electrical apparatus, comprising:
the battery according to claim 17.

* * * * *